April 19, 1927.  
J. F. HIGBEE  
TRAILER  
Filed Nov. 23, 1923

INVENTOR.  
BY James F. Higbee  
Raymond A. Parker  
ATTORNEY.

Patented Apr. 19, 1927.

1,625,209

UNITED STATES PATENT OFFICE.

JAMES F. HIGBEE, OF DETROIT, MICHIGAN, ASSIGNOR OF ONE-HALF TO STEPHEN A. GRIGGS, OF DETROIT, MICHIGAN.

TRAILER.

Application filed November 23, 1923. Serial No. 676,484.

My invention relates to improvements in trailers.

An object is to provide a trailer so constructed that it will not "nose" or sway on the road when trailed. There is a tendency in trailers, and this becomes particularly noticeable after the mechanism is worn, for the trailer to sway from side to side on the road and to cut in when turning a corner. This is particularly undesirable and is a danger not only to the trailer but to other passing vehicles on the highway.

My invention relates to improved mechanism designed to exert a yielding pressure on the steering mechanism of the trailer to limit the turning movement thereof transmitted through the road wheels to the steering mechanism and arising from any looseness in the connections comprising the steering mechanism or by means of which the trailer is attached to the power truck. The construction is such that a relatively great force must be applied to the connection between the power truck and the trailer to impart turning movement to the steering mechanism of the trailer and any force less than this predetermined force will not produce turning movement of the trailer mechanism, and the arrangement is such that it is practically impossible for any shock given to the road wheels to cause any turning movement of the mechanism. The steering traction wheels of the trailer are, therefore, held in alinement with the rear wheels of the truck behind which the trailer is mounted and track therewith.

The particular construction of my improvement and its important features will more fully appear in the following description of the illustrative embodiment shown in the drawings and defined in the appended claims.

In the drawings,—

Figure 1:
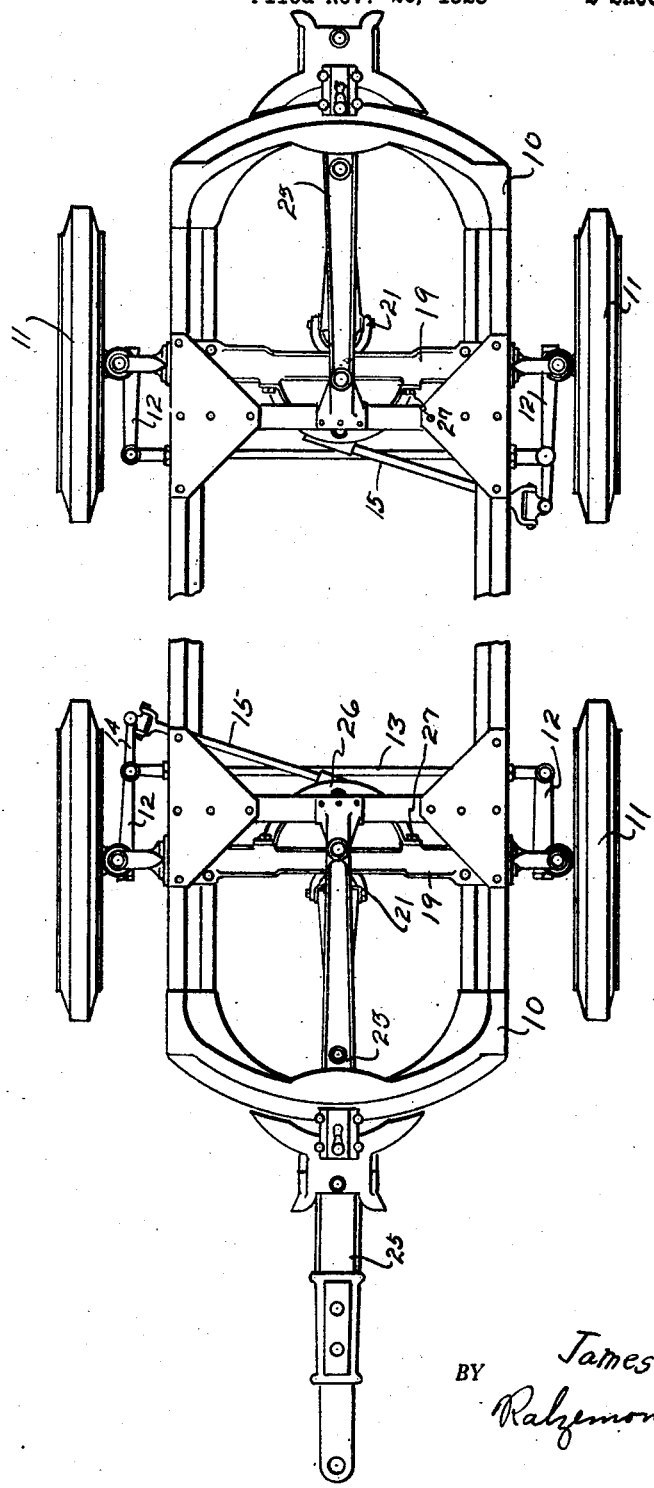
Figure 1 is a plan view of the trailer equipped with my improvement, the trailer being partly broken away.

I have shown a trailer having a frame 10 provided with front and rear axles upon which are mounted road wheels 11. The trailer is so constructed that each pair of wheels is mounted for turning movement in order that it may be connected at either end to the vehicle to be trailed thereby and at each end steering mechanism is provided. The construction of the rear end of the trailer is similar to that of the forward end and as a matter of fact there is no such distinction between the two ends of the trailer and the construction at one end only will be described.

The road wheels are carried by suitable steering knuckles and 12 indicates steering arms connected by a tie rod 13. An extension 14 on one of the steering arms is connected by a drag link 15 to a pivotally mounted member 16 which forms a part of the steering mechanism. This member 16 is supported for turning movement upon a pin 17 secured to a suitable portion of the axle structure. Springs 18 support the frame upon the axles of the vehicle and the crosspiece 19 extends lengthwise the axle and is secured thereto above the springs by bolts 20.

The pivotally mounted steering member 16 has a forward extension which terminates in a yoke 21. An adjustable link 22 connects this yoke with a tongue member 23 which is normally pivoted at 24 to the frame of the vehicle. This tongue member has a forward extension 25 which is adapted for attachment to a power truck so that the trailer may be drawn thereby. Pivotal movement of the tongue member produces turning movement of the steering mechanism.

The above described construction is standard and forms no part of my invention except in so far as it is associated with other novel features thereof.

In the construction above described, after the trailer has been in service for some time, wear of the movable parts of the steering mechanism and its various connections with the power truck produces looseness of the parts and there is a resulting "nosing" of the trailer on the road. This undesirable action is accentuated by shocks imparted to the road wheels which produce swaying movement of the trailer.

To prevent this undesirable movement of the trailer I provide centering means which tends to hold the steering mechanism of the trailer against turning movement except upon the application of a predetermined pressure to the connection made between the trailer and the power truck. The leverage exerted upon such connection is so much greater than any which can be exerted upon the steering mechanism through the road wheels that it is practically impossible to release the centering means by force imparted through the road wheels.

Figure 2:
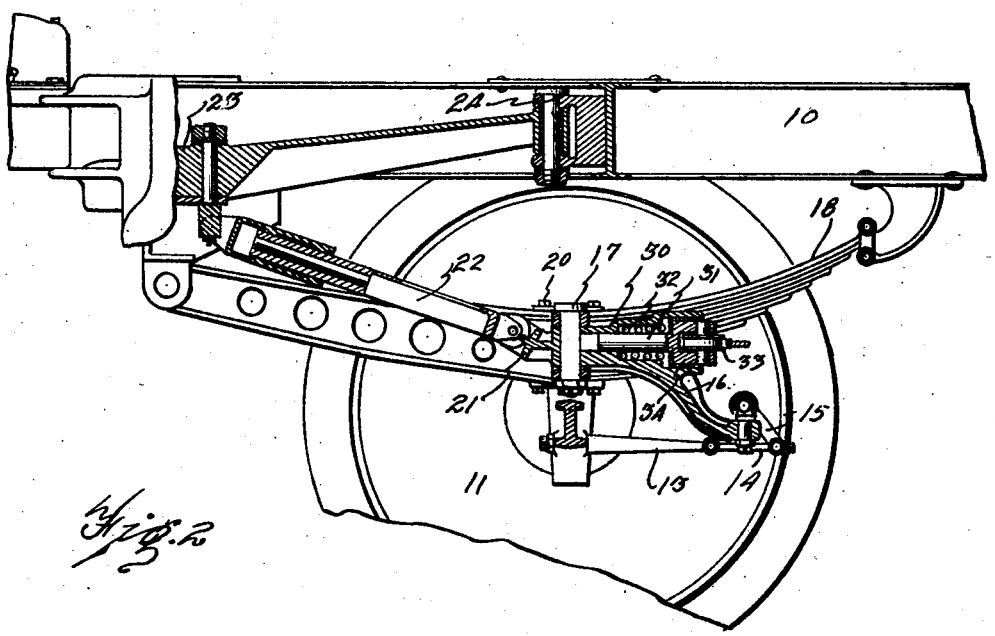
Fig. 2 is a sectional view longitudinally of the trailer showing my improvement and its association with the steering mechanism of the trailer.
Figure 3:
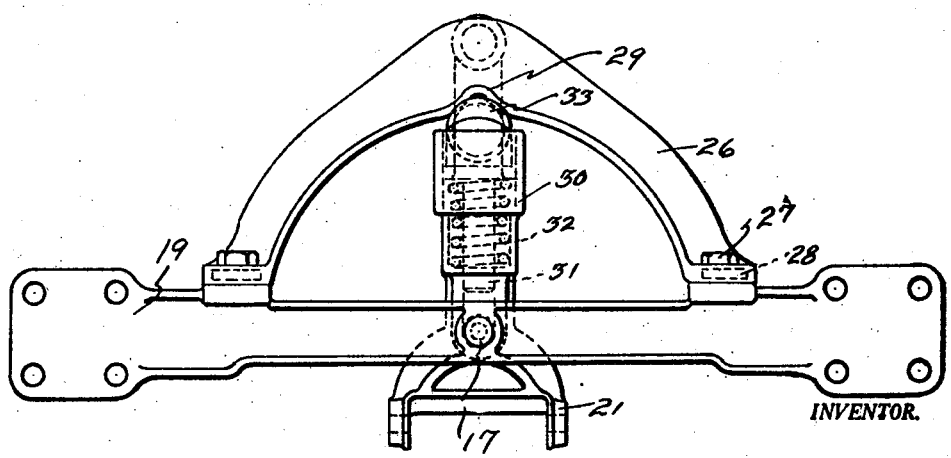
Fig. 3 is a plan view of my improvement associated with a portion of the trailer construction.

I provide a bow 26 secured by bolts 27 to the cross-piece 19. The openings 28 in the bow through which the bolts 27 extend are in the form of slots so that the bow may be adjusted relative the cross-piece after the road wheels have been alined in order that the steering mechanism will be centered with the road wheels in alinement. This bow is provided on its concave face with a centering recess 29. The steering member 16 has a portion 30 hollowed out to receive a plunger 31 held outwardly by a spring 32 so that a grooved roller 33 carried by the head 34 of the plunger is held yieldingly in engagement with the inner face of the bow 26. As will be seen from Fig. 2, the plunger has a permitted inward movement relative its support so that it may move inwardly to permit pivotal motion of the member 16, the roller 33 traveling over the inner face of the bow 26, and that when the roller is brought into registry with the recess 29 of the bow, it falls therein and centers the steering mechanism against turning movement. The tension on the spring 32 is such that the steering mechanism is held from its turning movement until sufficient force is applied to the tongue member to release the roller and permit movement of the steering mechanism.

What I claim is:

1. In a trailer, an axle provided at its ends with steering knuckles carrying traction wheels, steering arms and a tie rod connecting said steering knuckles, a drag link pivoted to one of said steering arms, a tongue pivoted to the vehicle and adapted to be attached to another vehicle for towing, a bow rigid with the axle extending rearwardly thereof, a steering member pivoted to the axle having an adjustable extension forwardly of its pivot point connected with the tongue for turning and an extension rearwardly of its pivot point connected with the drag link for steering, said steering member having a socket, a spring-pressed plunger in said socket having a nose adapted to travel over said bow, said bow having a recess adapted to engage the nose of the plunger to releasably hold the same to prevent turning movement of the steering member.

2. In a trailer, an axle structure provided with steering knuckles carrying traction wheels connected by steering arms and a tie rod, a tongue pivoted to the vehicle above the axle, a steering member pivoted to the axle having an extension forwardly thereof connected with the tongue for turning and having an extension rearwardly of its pivotal connection with the axle connected by a drag link with a steering arm for steering, a bow rigid with the axle, a spring-pressed plunger carried by said steering member held yieldably against said bow to releasably center the steering member against turning.

3. In a trailer, an axle provided with steering knuckles carrying traction wheels connected for turning movement by steering arms and a tie rod, a spring-supported frame mounted on the axle, a tongue pivoted to the frame and having a forward attachment for connection with another vehicle, a steering member pivoted to the axle, an extensible link pivoted to the steering member and to the tongue, said steering member having a rearward extension connected by a drag link through the steering arms and tie rod with the steering knuckles for steering, a bow rigid with the axle, said bow being adjustable longitudinally of the axle, said steering member provided with a part held outwardly yieldably against the bow to releasably center the steering member against turning movement.

4. In a trailer, an axle having traction wheels at each end mounted upon steering knuckles connected by steering arms and a tie rod, a frame supported by springs upon the axle, a tongue pivoted to the frame, a steering member pivoted to the axle, said steering member having a yoke forwardly of its pivot point with the axle, an extensible link hinged within said yoke for vertical swinging movement and pivotally connected at its forward end to the tongue, said steering member having a rearward downward extension, a drag link pivoted to said extension and connected with the tie rod and steering arms to provide for steering movement, a bow upon the axle, said steering member provided with a part held yieldably in engagement with the bow to releasably center the steering member against pivotal movement.

In testimony whereof, I sign this specification.

JAMES F. HIGBEE.